United States Patent [19]
Knapp

[11] 3,936,947
[45] Feb. 10, 1976

[54] ROTATING ARM AIMING DEVICE SYSTEM

[75] Inventor: Ralph E. Knapp, Canoga Park, Calif.

[73] Assignee: Lear Siegler, Inc., Santa Monica, Calif.

[22] Filed: Oct. 24, 1972

[21] Appl. No.: 299,865

[52] U.S. Cl. .................. 33/275 G; 33/285; 356/149
[51] Int. Cl. ............................................. G01c 19/38
[58] Field of Search .......... 33/275 G, 285; 356/149, 356/1, 138

[56] References Cited
UNITED STATES PATENTS

| | | |
|---|---|---|
| 2,966,744 | 1/1961 | Mueller .............................. 33/275 G |
| 3,001,290 | 9/1961 | Rellensmann et al. ........... 33/275 G |
| 3,162,951 | 12/1964 | Hintze et al. ...................... 33/275 G |
| 3,283,409 | 11/1966 | Rothe et al. ....................... 33/275 G |
| 3,419,967 | 1/1969 | Rocks et al. .................. 33/275 G X |

*Primary Examiner*—William D. Martin, Jr.
*Attorney, Agent, or Firm*—Jackson & Jones

[57] ABSTRACT

A method and apparatus for establishing the azimuth position of a remote object is provided utilizing a north seeking gyro and a rotating transfer arm. Alignment devices such as an autocollimating telescope is provided at one end of the transfer arm for determining the relative position and alignment of the remote object to the transfer arm. A balance weight is provided at the other end of the arm to provide appropriate compensation for free rotation. The output of the north seeking gyro is connected to the transfer arm through an encoder while the telescope is rotatably connected to the transfer arm also through an encoder. The sum of the two angles measured by the encoders will provide the azimuth position angle for the remote object.

28 Claims, 2 Drawing Figures

ROTATING ARM AIMING DEVICE SYSTEM

BACKGROUND OF THE INVENTION

1. Field of the Invention

The present invention is directed to an apparatus in combination with a north seeking gyro to determine the azimuth position of a remote object for positioning of the remote object relative to the azimuth. More particularly, the present invention is directed to a rotating transfer arm mounted on a north seeking gyro that permits the north seeking gyro to be maintained stationary as the transfer arm is aligned with the remote object to determine its relative position.

2. Description of the Prior Art

Various attempts have been made in the prior art for determining the position of a remote object with respect to the azimuth in a relatively short period of time. For example, in directional equipment that is mounted on mobile trucks where it is desired to align the equipment relative to the true north, it has often been necessary to expend a considerable amount of time surveying the proposed location and establishing the exact alignment of true north at the site. After the direction of true north has been established and marked at the site by, for example, positioning blocks, it was necessary to utilize a number of theodolites as angle measuring devices for transferring the azimuth from the calibrated blocks to the remote object. Since the truck carrying the equipment can have a variable location relative to the mounting blocks, it was necessary to provide a theodolite with a parallel slide for moving the established angular relationship between the theodolite and another theodolite mounted above one of the mounting blocks to a perpendicularly aligned prism mounted on the guidance platform of the equipment. The time and effort involved was extensive and meant that the equipment remained inoperative for an excessive period of time before it could be properly aligned. Further, it was necessary to employ a surveying team to establish the position of the mounting blocks at the site location before the equipment could become operative. Generally, it has been found that depending on the latitude, the true north can be approximated within a plus or minus seven degrees for aligning equipment. However, the exact alignment to the azimuth within a range of seconds has been found to be extremely difficult.

Frequently, celestial sightings have been utilized to determine the true north. This method, however, suffers the disadvantage of being subjected to environmental weather conditions.

Recently, a rugged north seeking gyro has been developed, as disclosed in the Ambrosini U.S. Pat. No. 3,512,264 granted May 19, 1970 which permits an exact determination of the true north within a remarkably short period of time. However, as can be appreciated by those skilled in the art, a north seeking gyro instrument pendulously or otherwise mounted in extremely sensitive to any movement once it has been activated and nears final alignment.

SUMMARY OF THE INVENTION

The present invention provides a method and apparatus of combining a north seeking gyro with a rotating transfer arm that mounts an alignment means at one end of the transfer arm. The alignment means is capable of determining the relative heading of the remote object and can, for example, be an autocollimating or autoreflecting telescope. Means are provided for determining the azimuth of the remote object from the position of the alignment means and from the output indicator of the north seeking gyro. These determining means include a pair of encoders having their rotors rotatably connected through a flexible bellows connection respectively to the telescope and the north seeking gyro. Calibration means, including a mirror, is provided to ensure that the horizontal alignment of the telescrope will be maintained relative to the horizontal alignment of the north seeking gyro. In transferring the azimuth to the remote object, the true north is determined by the north seeking gyro and then the transfer arm is rotated to align its autocollimating telescope with a reflector such as a porro prism on the remote object. The encoders then determine the sum of the relative angles to give the horizontal direction in which the telescope is pointing. This result can be transmitted to the remote object and the remote object can be accordingly moved until it is in alignment.

Frequently, portable equipment will have a guidance platform that will incorporate a gyroscope and a porro prism for determining the relative position of the prism with the guidance platform gyroscope. The gimbals of the gyroscope are generally maintained locked on the guidance platform and the azimuth determined by a first reading with the equipment accordingly adjusted. After the azimuth adjustment has been provided to the equipment or at least stored in the guidance system, a second reading is accomplished with the gimbals unlocked to ensure the appropriate azimuth aligning.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

DESCRIPTION OF THE PREFERRED EMBODIMENT

Figure 1:
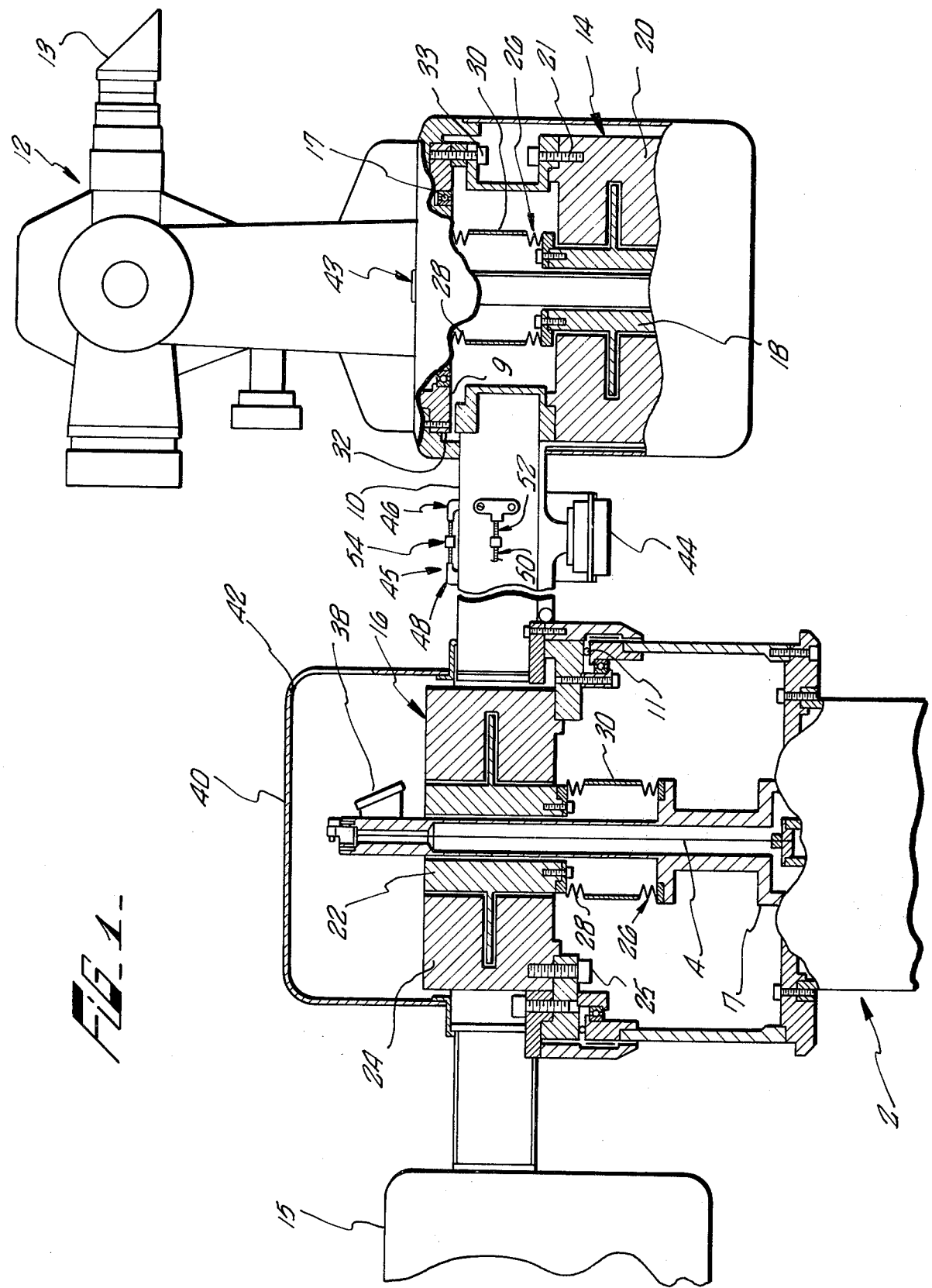
FIG. 1 is a cross-sectional view of the present invention.

Referring to FIG. 1, a north seeking gyro 2 utilizes a suspension band 4 that pendulously supports in the vertical plane or axis the rotary gyro (not shown). The details of this north seeking gyro can be found in U.S. Pat. No. 3,512,264 granted to Ambrosini. Briefly, the gyro will quickly align itself with the meridian of the earth and oscillations will be damped out by coil torquers (not shown) which are mounted respectively on the rotary gyro and the container 7 which encloses and follows the rotary gyro. The transfer arm 10 is mounted for rotation on the bearings 11 at the top of the north seeking gyro 2 and has a radial axis relative to the vertical reference axis of the gyro 2. At one end of the transfer arm 10, a telescope 12 is mounted and can be an autocollimating or autoreflecting telescope. In a preferred embodiment, a 30X telescope with autocollimation capability that can be focused from 1.7 meters to infinity has been used. A balanced weight 15 is mounted at the other end of the rotating transfer arm 10 and the combined dimensions of the transfer arm 10, telescope 12 and balanced weight 15 provide equal wind resistance so that the trnasfer arm 10 will be stable and not influenced by wind. For the convenience of the operator, a 60° eyepiece 13 can be mounted on the telescope 12 so that an operator can look downward when utilizing the telescope 12. Bearings 17 mount the telescope 12 rotatably on the transfer arm 10 and an encoder 14 consisting of a rotor 18 and a stator 20 is connected to the telescope 12. The stator 20 is held by fasteners 21 to the transfer arm 10. The rotor 18 is connected directly to follow the line of sight of the telescope 12 through a bellows assembly 26 that comprises an upper and lower flexible bellows 28 intermediately connected by a metalic cylindrical sleeve 30. The bellows assembly 26 must transmit rotational information to a high degree of accuracy (1 to 2 arc seconds maximum error) over a wide temperature range and with adequate compliance in all axis other than the axis of rotation. While the maximum torque required to rotate the encoders 14 and 16 is small (ounce-inches) the tortional spring constant of the coupling must be very high when considering the angular deflection allowed. The bellows 26 and 28 possess the high tortional spring constant required as they are composed essentially of parallel plates, welded at the periphery. Thus, the bellows assembly 26 provides a sensitive and accurate following of the rotor 18 with the actual movement of the telescope 12. A pair of 18 bit whole word optical encoders have been successfully utilized in the present invention. A similar bellows connection is employed to connect the rotor 22 with the container housing 7.

The container housing 7 will, by virtue of the alignment of the coil torquers (not shown) be positioned at a 90° relationship to the meridian or along the azimuth. The gyro encoder 16 has its stator 24 connected by appropriate fasteners 25 to the transfer arm 10. The standard deviation of all errors is 10 arc seconds which is composed of errors from the following sources; total transfer arm 10, both encoders 14 and 16 plus accompanying electronic bellows coupling errors, telescope errors, errors due to non-parallelism of the vertical axis of the telescope with respect to vertical axis of the north seeking gyro and operator errors.

The electronic unit (not shown) basically consists of a control panel, binary to decimal converter (binaverter) electronics, power supply and the optical encoders electronics. The north seeking gyro 2 can be mounted on a foldable tripod assembly (not shown) which consists of a base plate and three hinge-mounted legs. Three hold-down clamps installed on the base plate are used to secure the gyro unit 2 in the tripod assembly. A circular level vial can be provided on the base plate to enable coarse leveling of the instrument. Three fine-leveling screws can be provided on the base plate for adjusting the assembly during set up procedures. A center section on each leg can be adjusted by loosening a height-locking clamp assembly. The ends of the legs can be pointed to maintain the assembly stable during operations.

Various locks and telescope controls can be provided to permit the operator to adjust and hold elevation, aximuth, reticle focus and telescope focus. A magnetic compass (not shown) can be provided on any of the equipment covers to provide a rough directional reference.

A bubble level 43 is provided on the base of the aiming telescope 12 to indicate the level of the system while making azimuth alignments and transferring azimuth lines.

Alignment compression plates 32 can be positioned adjacent the telescope mounting 9 to permit a vertical alignment by the torquing of appropriately positioned bolts 33. To supplement or replace the compression plates 32, a trio of fine adjusting screws (not shown) can be provided to adjust the vertical alignment.

The transfer arm 10 can have mounted on it one or more jack assemblies 45 to assist in parallel aligning the vertical axis of the telescope 12 to the vertical axis of the north seeking gyro 2. Frequently, the equipment to be aligned with respect to the true north direction will not lie on the same horizontal plane as the telescope 12 and it is necessary to insure that the vertical axis of the north seeking gyro 2 and the telescope 12 are reasonably parallel. Since the transfer arm 10 is cantilevered from the north seeking gyro 2 there is a tendency for the transfer arm 10 to bend under the gravitational pull of the earth. The use of the jacks 45 permit compensation stress to be introduced to the transfer arm 10. Preferably, the jacks 45 will at least be positioned on the top and bottom of the transfer arm 10. It is, however, possible to utilize the jacks 45 on all four sides of the transfer arm 10. The jacks 45 are anchored at points 46 and 38 to the transfer arm 10 and threaded rods 50 and 52 are connected by an adjustment nut 54 to exert either a compensation compression or tension stress to the transfer arm 10 through the anchor points 46 and 48. This compensation stress will insure a parallel alignment of the gyro 2 and the telescope 12 vertical axis.

The entire rotating arm aiming device system can be initially calibrated from a known set reference. Generally a reference telescope aligned with the set references will be aligned with the telescope 12 to insure a proper reference point for true north. A mean average of readings through 360° with the gyro 2 will be taken to determine any deviational errors from the standard reference true north. The final reading is then taken at the mean average and any corrections to the system are then made.

This calibration correction is then physically transferred to the particular instrument by aligning the telescope 12 with an alignment mirror 38 connected to the container housing 7. The binary read out of this value is recorded and preferably attached to the casing of the gyro 2 as an azimuth decal. A calibration alignment of the encoder 14 and 16 read outs can be thus accomplished before each operation of the gyro system by autocollimating the telescope 12 to the alignment mirror 38 and adding or subtracting from the binary read out of the encoders 14 and 16 in an offset switch panel until the known calibration reading on the aximuth decal is duplicated and the system is calibrated. A cover 40 has a window 42 for the appropriate alignment of the telescope 12 with the mirror 38.

As mentioned above, vertical deviations from a relative parallel arrangement of the axis of the telescope 12 and the axis of the gyro 2 are a source of error. This error can be minimized to a tolerable degree by the following procedure. The telescope standards or base has a bubble level 43 mounted on the theodolite axis in the vertical gravitational plane of the telescope 12. The telescope base 12 is rotated 360° to determine any deviations from this vertical plane. If any deviations are found, the legs of the tripod assembly are then adjusted until the telescope 12 can be rotated 360° without displacing the bubble of the level.

At this point, it is then known that the telescope axis is in the vertical gravitational plane. To make sure that the gyro axis is also in the vertical gravitational plane and thus parallel, the transfer arm 10 is rotated 180° degrees or until the maximum error is found on the bubble level 43. The correction adjustment is generally one half of the displacement reading of the bubble level 43. This adjustment is accomplished by the appropriate addition of compression or tension stress to the adjustment arm by the jacks 45. Generally the adjustment is the addition of compression to the top of the transfer arm 10. This procedure is repeated until any deviation from parallel is within 5 arc seconds.

Figure 2:
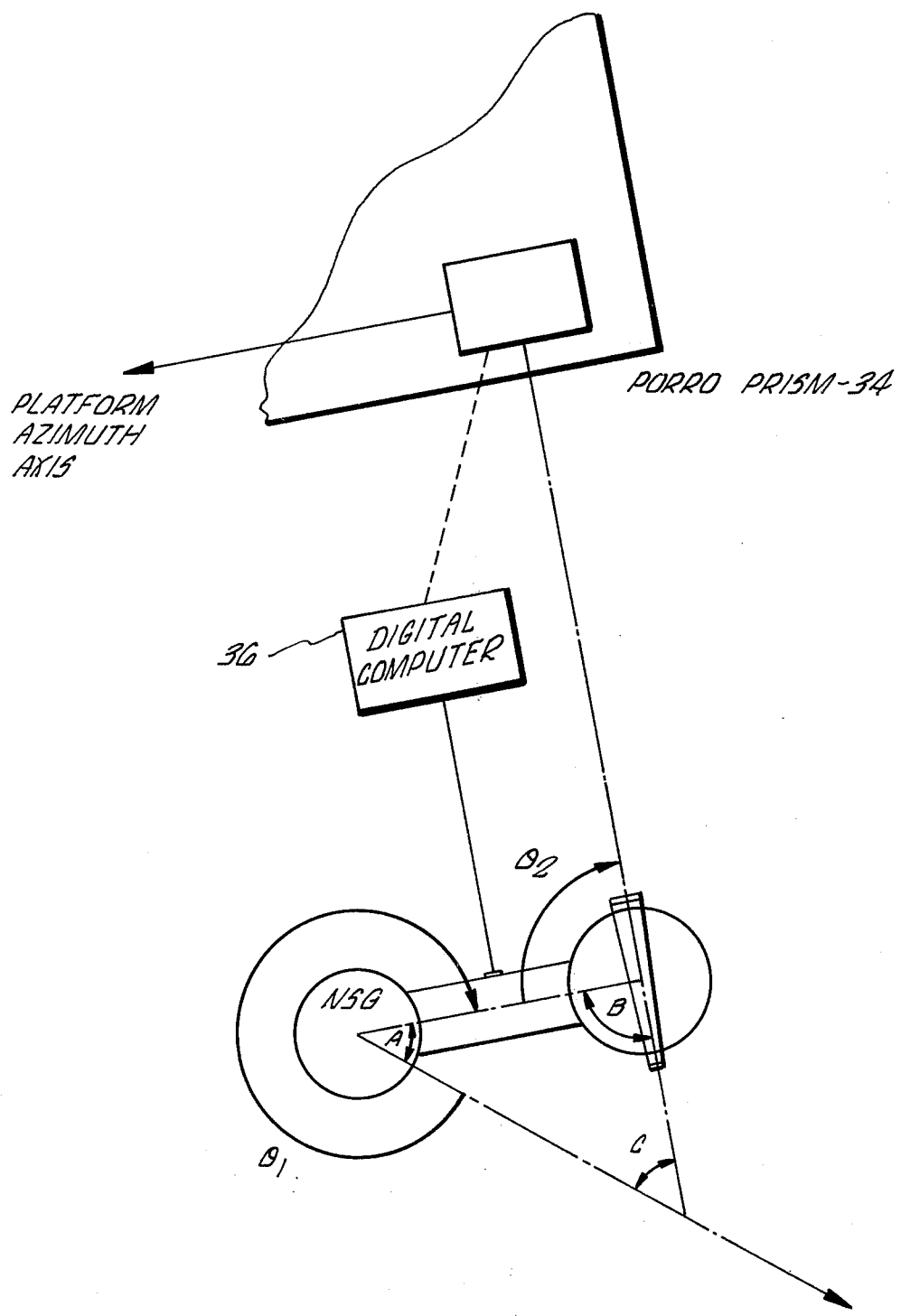
FIG. 2 is a schematic illustration of the present invention.

In operation, the relationship between the angles A, B, and C, and seen in FIG. 2, is set forth as follows:

$$<A + <B + <C = 180°$$
$$360° - \theta_1 + 180° - \theta_2 + <C = 180°$$
$$<C = \theta_1 + \theta_2 - 360°$$
$$<C + 180° = \theta_1 + \theta_2 - 180°$$
$$<C + 180° = (\theta_1 - 180°) + \theta_2, \theta_1 = \theta_1 - 180°*$$
$$HDG = \theta_1 + \theta_2$$

*(Accomplished by the encoder mounting method)

As can be seen from the above calculations, the summation of the two encoder outputs from the north seeking gyro 2 and the telescope 12 will provide the appropriate azimuth position of the object to be aligned. After the appropriate calibration steps have been accomplished, the north seeking gyro 2 is activated and given sufficient time to establish a meridian. If desired, and antibacklash gear locking torque can be applied so that when the transfer arm 10 is rotated, it will not disturb the meridian position of the gyroscope 2. The actual physical dimension of the radius or radial axis of the transfer arm 10 from the north seeking gyro axis to the telescope 12 will depend upon the relative distance from the remote object and the initial error range of alignment of the object. For example, a truck carrying directional equipment can use a magnetic compass to position itself within a plus or minus seven degrees of the true north. If the north seeking gyro 2 must be positioned 90 inches from the guidance platform, then the arm must be 12 inches in radial length to ensure a complete range of movement to the telescope within the plus or minus 7 degrees. If the equipment has a guidance system of its own that utilizes a gyro, the equipment will initailly be utilized with the gyro or gimbals of the gyro in a locked or caged position. The transfer arm 10 and telescope 12 are rotated until the telescope 12 is aligned with, for example, a porro prism 34. The outputs from the encoders 14 and 16 are added in a digital computer 36 to provide the correction to the platform of the equipment. Generally the equipment will be moved in accordance with this correction to assume a relatively rough alignment with the azimuth. The transfer arm 10 and telescope 12 are then again rotated until the telescope 12 can position itself relative to the porro prism 34 which in some embodiments can be advantageously arranged to be perpendicular to the platform axis. The gyro system of the equipment would be uncaged and a second reading would be taken to provide a fine adjustment within .1 mil of the desired azimuth. The entire operation can be performed in less than seven and one half minutes and does not require external information such as a predetermined pair of mounting blocks that have been aligned with respect to the true north. Thus, the equipment can be quickly utilized with respect to the correct azimuth in a relatively short period of time at any location. By use of the transfer arm 10 and its particular mounting arrangement with the north seeking gyro 2, the north seeking gyro 2 will be relatively undistrubed and will be able to provide a reference azimuth reading which can ultimately be conveyed to the equipment.

It should be noted that various modifications can be made to the apparatus while still remaining within the purview of the following claims.

What is claimed is:

1. In a north seeking gyro system for establishing an azimuth position of a remote object including establishing an azimuth position of a remote object including a north seeking gyro having a directional reference output and a reference axis, the improvement comprising:
   a transfer arm;
   mounting means connected to the transfer arm and the gyro for permitting movement of the transfer arm relative to the gyro;
   an alignment device capable of focusing a line of sight at the remote object and rotatably mounted on the transfer arm at an offset radial position relative to the reference axis of the gyro;
   first means operatively connected with the alignment device for providing an indication of the angular position of the line of sight of the alignment device relative to the reference axis of the gyro;
   second means operatively connected with the gyro for providing an indication of the angular radial position of the alignment device relative to the directional reference output established by the gyro, the azimuth of the remote object being determined from the indication outputs of the first and second means.

2. The invention of claim 1 wherein the mounting means permits a rotational movement of the transfer arm about the reference axis of the gyro.

3. The invention of claim 11 wherein the first means includes a first encoder connected to the alignment device and the second means includes a second encoder connected to the gyro.

4. The invention of claim 3 wherein the alignment device is a telescope.

5. The invention of claim 3 wherein the first and second encoders are rotatably connected respectively to the telescope and gyro by flexible bellow connections.

6. The invention of claim 5 wherein the alignment device is an autocollimating telescope.

7. The invention of claim 4 further including means for calibrating the vertical alignment of the telescope relative to the reference axis of the gyro.

8. The invention of claim 3 further including a weight member mounted on the transfer arm to balance the arm about its mounting means.

9. The invention of claim 4 wherein the transfer arm surface area has equal wind resistance on both sides of the mounting means.

10. The invention of claim 4 further including compression pads adjacent the mounting of the telescope to permit vertical adjustment of the telescope relative to its vertical axis.

11. The invention of claim 4 further including a porro prism mounted on the remote object to permit relative alignment.

12. The invention of claim 3 further including calibrating means for the encoders including a container for the gyro and a mirror mounted on the container adjacent the gyro.

13. The invention of claim 12 further including means operatively connected with the first and second means for transferring the azimuth position to the remote object.

14. The invention of claim 1 further including means operatively connected with the alignment device for parallel alignment of the vertical axes of the alignment device and the north seeking gyro.

15. The invention of claim 14 wherein the means for parallel alignment includes means for applying stress to the transfer arm to move the arm relative to the gyro vertical axis.

16. The invention of claim 14 wherein the means for applying stress includes at least one jack apparatus mounted on the transfer arm.

17. The invention of claim 3 further includes means for determining the azimuth of the object including a digital computer operatively connected with the first and second means.

18. The invention of claim 17 wherein both the first and second encoders are respectively connected to the transfer arm.

19. In a north seeking a gyro system for establishing an azimuth position of a remote object including a north seeking gyro having a directional reference output and a reference axis, the improvement comprising:
   a transfer arm having a radial axis;
   mounting means connected to the transfer arm and the gyro for permitting rotational movement of the transfer arm about the gyro reference axis;
   a telescope device capable of focusing a line of sight at the remote object and mounted rotably on the transfer arm at an offset radial position relative to the reference axis of the gyro;
   first means including a first encoder connected to the telescope and the transfer arm for providing a signal representative of the angular position of the line of sight of the telescope relative to the radial axis of the transfer arm;
   second means including a second encoder connected to the directional reference output of the gyro and the transfer arm for providing a signal representative of the angular position of the radial axis of the transfer arm relative to the directional reference output established by the gyro; and
   output means for determining the azimuth of the remote object from the output signals of the first and second means.

20. The invention of claim 19 further including means operatively connected with the telescope for parallel alignment of the vertical axes of the telescope and the gryo.

21. The invention of claim 19 wherein the output means for determining the azimuth includes a digital computer.

22. The invention of claim 19 further including flexible bellows for connecting the telescope and the gyro respectively to the first and second encoders.

23. A method of establishing the relative position of a remote object to the azimuth with a north seeking gyro and a rotatable transfer arm with a radial axis having a telescope rotably mounted on the transfer arm, comprising the steps of:
   determining true north from the north seeking gyro;
   rotating both the transfer arm and the telescope relative to the transfer arm without moving the gyro until the telescope's line of sight is co-ordinated to the object, and
   determining the azimuth of the object from the relative angles between respectively the transfer arm radial axis and true north and the line of sight of the co-ordinated telescope and the transfer arm radial axis.

24. The method of claim 23 further comprising the steps of transmitting the azimuth position to the object and moving the object until it aligns with the azimuth.

25. The method of claim 24 further including applying stress to the transfer arm through the jack apparatus to move the transfer arm.

26. The method of claim 24 further comprising the steps of rotating the transfer arm without moving the gyro until the telescope is co-ordinated with the aligned position of the object; re-determining the azimuth of the object from the relative angles between the true north and the position of the telescope; comparing the aligned position of the object with the azimuth position from the gyro and moving the object if necessary in accordance with the comparison results to ensure a correct azimuth position.

27. A method of establishing the relative position of a remote object to the azimuth with a north seeking gyro having a rotatable transfer arm with a radial axis, a telescope rotatably mounted on the transfer arm, a pair of encoders connected respectively to the north seeking gryo and the telescope and a calibration indicator such as a mirror mounted on the gryo, comprising the steps of:
   collimating the telescope to the mirror;
   adjusting if necessary the encoders output reading to a predetermined reading for calibration of the encoders;
   determining true north from the north seeking gyro;
   rotating both the transfer arm and the telescope relative to the transfer arm without moving the gyro until the telescope's line of sight is coordinated to the object; and
   determining the azimuth of the object from the output signals of the encoders representing the relative angles between respectively the transfer arm radial axis and true north and the line of sight of the coordinated telescope and the transfer arm radial axis.

28. A method of establishing the relative position of a remote object to the azimuth with a north seeking gyro having a rotatable transfer arm with a radial axis having a telescope rotatably mounted on the transfer arm and at least one jack apparatus mounted on the transfer arm, comprising the steps of:
   moving the transfer arm to parallel align the vertical axis of the telescope with the vertical axis of the north seeking gyro;
   determining true north from the north seeking gyro;
   rotating both the transfer arm and the telescope relative to the transfer arm without moving the gyro until the telescope's line of sight is coordinated to the object; and
   determining the azimuth of the object from the relative angles between respectively the transfer arm radial axis and true north and the line of sight of the coordinated telescope and the transfer arm radial axis.

* * * * *

UNITED STATES PATENT AND TRADEMARK OFFICE
CERTIFICATE OF CORRECTION

PATENT NO. : 3,936,947
DATED : February 10, 1976
INVENTOR(S) : Ralph E. Knapp

It is certified that error appears in the above-identified patent and that said Letters Patent are hereby corrected as shown below:

```
Col. 4, line 27 delete "38" insert --48--
Col. 4, line 55 delete "aximuth" insert --azimuth--
Col. 6, Claim 1, line 11 and 12 delete "establishing an
        azimuth position of a remote object including"
Col. 6, Claim 3, line 37 delete "11" insert --1--
Col. 7, Claim 16, line 13 delete "14" insert --15--
```

Signed and Sealed this

Thirteenth Day of July 1976

[SEAL]

Attest:

RUTH C. MASON
*Attesting Officer*

C. MARSHALL DANN
*Commissioner of Patents and Trademarks*